United States Patent
Webster et al.

(10) Patent No.: US 7,729,606 B2
(45) Date of Patent: Jun. 1, 2010

(54) LENS MODULE AND DIGITAL CAMERA MODULE USING SAME

(75) Inventors: Steven Webster, Taipei Hsien (TW); Ying-Cheng Wu, Taipei Hsien (TW); Chun-Hung Lin, Taipei hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 585 days.

(21) Appl. No.: 11/682,275

(22) Filed: Mar. 5, 2007

(65) Prior Publication Data

US 2008/0100934 A1 May 1, 2008

(30) Foreign Application Priority Data

Oct. 25, 2006 (CN) .......................... 2006 1 0063287

(51) Int. Cl.
*G02B 7/04* (2006.01)
*G02B 7/02* (2006.01)
*G03B 3/00* (2006.01)
*G03B 13/00* (2006.01)
*H04N 5/225* (2006.01)

(52) U.S. Cl. .................. 396/144; 359/819; 348/340; 348/342

(58) Field of Classification Search ................. 396/144
See application file for complete search history.

(56) References Cited

U.S. PATENT DOCUMENTS 6,122,114 A * 9/2000 Sudo et al. ................. 359/819
6,541,284 B2 * 4/2003 Lam .............................. 438/7
7,502,183 B2 * 3/2009 Jao et al. ..................... 359/819
2006/0215055 A1 * 9/2006 Yoon ........................... 348/342
2007/0126915 A1 * 6/2007 Webster et al. .............. 348/340
2008/0080072 A1 * 4/2008 Chang ......................... 359/823

FOREIGN PATENT DOCUMENTS

| CN | 01270411.3 | 10/2002 |
| CN | 1776474 A | 5/2006 |
| CN | 1769939 A | 5/2008 |

* cited by examiner

*Primary Examiner*—Melissa J Koval
(74) *Attorney, Agent, or Firm*—Jeffrey T. Knapp

(57) ABSTRACT

A digital camera module (100) includes a lens module (20) and a chip package (50) mounted in a light path of the lens module. The lens module includes a first lens assembly (21) and a second lens assembly (23). The first lens assembly includes a first fixture (211) having a through hole (212) defined therein and at least one lens (218) received in the through hole. The second assembly includes a second fixture (23) having a through hole (232) defined therein and at least one lens (238) attached therein. One of the first fixture and the second fixture has a slotted annular ring (213) protruding therefrom with an annular slot (214) defined therein. The other has a male annular ring (235) extending therefrom, and the slotted annular ring and the male annular ring matingly engage with each other to fix the first lens assembly and second assembly together.

13 Claims, 4 Drawing Sheets

LENS MODULE AND DIGITAL CAMERA MODULE USING SAME

BACKGROUND

1. Technical field

The present invention generally relates to lens modules and digital camera modules using the lens module and, more particularly, to a lens module and a digital camera module using the lens module, which are used in portable electronic devices, such as mobile phones, personal digital assistants (PDAs), or palm-top computers.

2. Description of the Related Art

With the ongoing development of microcircuitry and multimedia technology, digital cameras are now in widespread use. High-end portable electronic devices, such as mobile phones and PDAs, are being developed to be increasingly multi-functional. Many of these portable electronic devices are now equipped with digital cameras.

FIG. 1 (related art) shows a typical digital camera module 90, which includes a substrate 91, a chip 92, a holder 93, a transparent board 94, and a lens module 95. The substrate 91 has an upper surface 912, which is provided with a predetermined circuitry formed thereon. The chip 92 is attached to the upper surface 912 and is electrically connected to the substrate 91 via a plurality of conductive wires 914. The lens holder 93 includes a cylinder portion 931 configured for receiving the lens module 95, a seat portion 933 from which the cylinder portion 931 projects, and a through hole 935 defined through the respective interiors of the cylinder portion 931 and the seat portion 933. The cylinder portion 931 has a diameter smaller than that of the seat portion 933, thereby forming a step surface 937 therebetween. The transparent board 94 is attached to the step surface 937 of the lens holder 93. The lens module 95 includes a barrel 952 and at least one lens 954 fixed to the barrel 952.

The lens module 95 is received in and screwed into the cylinder portion 931 of the holder 93. The seat portion 933 is attached to the substrate 91 and receives the chip 92 therein.

In the aforesaid digital camera module 90, the lens module 95 is threadedly engaged with the cylinder portion 931 of the holder 93, which may create certain problems. As such, a manual focusing procedure is needed in order to set the lens module 95 to form a focused image on the chip 92, which is time consuming and may adversely affect the production yield. Additionally, an optical axis of the lens module 95 may incline and be displaced from a center of the chip 92, which may accordingly adversely affect the quality of images formed by the digital camera module 90.

Therefore, an improved lens module and an improved digital camera module using the lens module are desired in order to overcome the above-described shortcomings.

SUMMARY

In one aspect, a lens module is provided. The lens module includes a first lens assembly and a second lens assembly. The first lens assembly includes a first fixture having a through hole defined therein, and at least one lens received in the through hole. The second lens assembly includes a second fixture having a through hole defined therein, and at least one lens attached to the second fixture. One of the first fixture and the second fixture has a slotted annular ring protruding therefrom with an annular slot defined therein, the other has a male annular ring extending therefrom, and the slotted annular ring and the male annular ring matingly engage with each other to fix the first lens assembly and second lens assembly together.

In another aspect, a digital camera module is provided. The digital camera module includes a lens module and a chip package. The lens module includes a first lens assembly and a second lens assembly. The first lens assembly includes a first fixture having a through hole defined therein and at least one lens received in the through hole. The second lens assembly includes a second fixture having a through hole defined therein and at least one lens attached to the second fixture. One of the first fixture and the second fixture has a slotted annular ring protruding therefrom with an annular slot defined therein. The other has a male annular ring extending therefrom, and the slotted annular ring and the male annular ring matingly engage with each other to fix the first lens assembly and second assembly together. The chip package is mounted in a light path of the lens module to receive a focused image formed by the lens module.

Other advantages and novel features will become more apparent from the following detailed description when taken in conjunction with the accompanying drawings.

BRIEF DESCRIPTION OF THE DRAWINGS

Many aspects of the present lens module and digital camera module can be better understood with reference to the following drawings. The components in the drawings are not necessarily drawn to scale, the emphasis instead being placed upon clearly illustrating the principles of the present lens module and digital camera module. Moreover, in the drawings, like reference numerals designate corresponding parts throughout the several views.

DETAILED DESCRIPTION OF THE PREFERRED EMBODIMENTS

Figure 1:
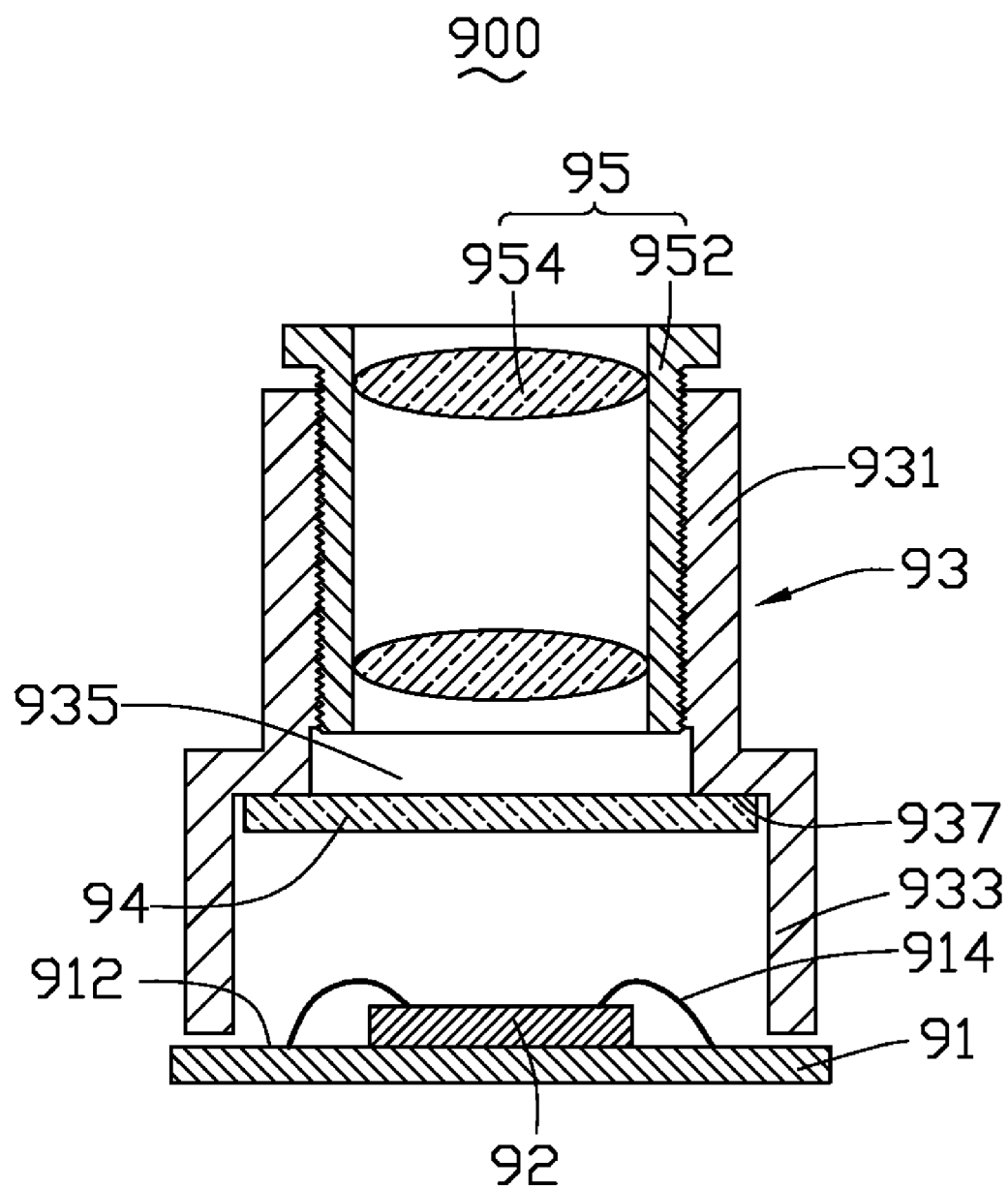
FIG. 1 is a cross-sectional view of a typical digital camera module.
Figure 2:
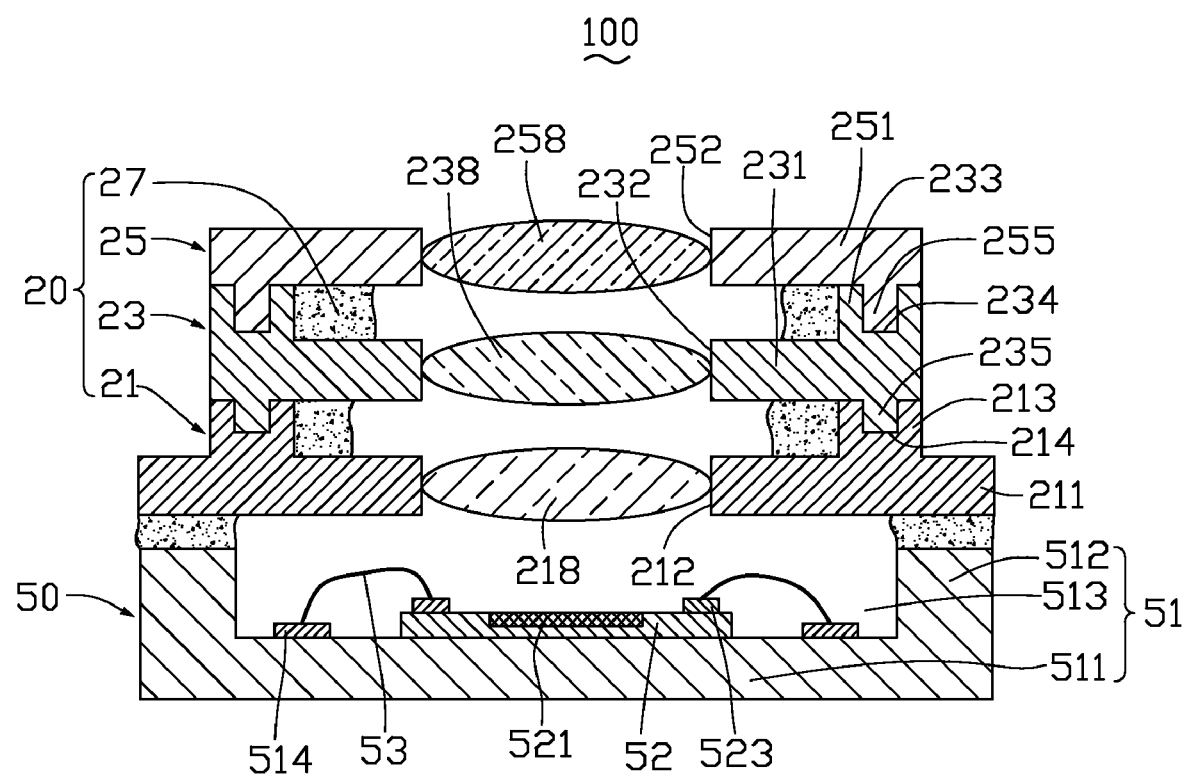
FIG. 2 is a schematic, cross-sectional view of a digital camera module having a lens module, according to a first preferred embodiment.

Referring now to the drawings in detail, FIG. 2 shows a digital camera module 100 according to a first preferred embodiment. The digital camera module 100 is constructed to include a lens module 20 and a chip package 50 disposed in a light path of the lens module 20 to receive a focused image formed by the lens module 20.

The lens module includes a first lens assembly 21, a second lens assembly 23, a third lens assembly 25, and an adhesive 27.

The first lens assembly 21 includes a first fixture 211 and a first lens 218 mounted to the first fixture 211. The first fixture 211 is substantially board shaped and has a top surface (not labeled), a bottom surface (not labeled), a through hole 212 defined in a middle portion thereof and penetrating through the top surface and the bottom surface, and a first top annular ring 213 (i.e., a slotted annular ring) upwardly projecting from the top surface thereof. The through hole 212 is used for receiving the first lens 218 therein. The first top annular ring 213, which is advantageously integrally formed with the top surface of the first fixture 211, has a first annular slot 214 defined in a top surface thereof. Further, the first annular slot 214 faces away from the top surface of the first fixture 211.

The second lens assembly 23 has a similar structure to that of the first lens assembly 21 and includes a second fixture 231 and a second lens 238 mounted to the second fixture 231. The second fixture 231 is substantially board shaped. The second fixture 231 has a top surface (not labeled), a bottom surface (not labeled), a through hole 232, a second top annular ring 233 (i.e., a slotted annular ring) with a second annular slot 234 defined therein, and a second bottom annular ring 235 (i.e., a male annular ring) downwardly projecting away from the bottom surface thereof. Beneficially, the second top annular ring 233 and the second bottom annular ring 235 are, respectively, integral with the top surface and the bottom surface of the second fixture 231. The second lens 238 is received in the through hole 232 of the second fixture 231 and is fixed to the second fixture 231. The second bottom annular ring 235 has a configuration approximately equal to that of the first annular slot 214 so that the second bottom annular ring 235 can tightly and matingly engage with the first top annular ring 213 of the first fixture 211, via the first annular slot 214.

The third lens assembly 25 has a similar structure to that of the first lens assembly 21 and includes a third fixture 251 and a third lens 258 mounted to the third fixture 251. The third fixture 251 is substantially board shaped and has a top surface (not labeled), a bottom surface (not labeled), a through hole 252, and a third bottom annular ring 255 (i.e., a male annular ring) downwardly and integrally projecting from the bottom surface thereof. The third lens 258 is received in the through hole 252 of the third fixture 251 and is fixed to the third fixture 251. The third bottom annular ring 255 has a configuration approximately equal to that of the second annular slot 234 so that the third bottom annular ring 255 can tightly engage in the second annular slot 234 of the second top annular ring 233.

In assembly the lens module 20, the second bottom annular ring 235 of the second lens fixture 231, and the third bottom annular ring 255 of the third lens fixture 251 are, respectively, inserted in and engage with the first annular slot 214 of the first lens fixture 211 and the second annular slot 234 of the second lens fixture 231. Meanwhile, the optical axes of the first lens 218, the second lens 238, and the third lens 258 are aligned with each other.

In order to enforce the connections between two adjacent lens assemblies, the adhesive 27 (e.g., glue, epoxy resin, etc.) should preferably be applied between each two adjacent lens fixtures, in order to fix neighboring lens fixtures to each other.

The chip package 50 includes a carrier 51, a chip 52, and a plurality of wires 53. The carrier 51 includes a base board 511, a sidewall 512 upwardly extending from a periphery of the base board 511, and a cavity 513 cooperatively formed by the base board 511 and the sidewall 512 for receiving electronic components. The carrier 511 further includes a plurality of contacts 514 arranged on a top surface of the base board 511 and contained in the cavity 513. The chip 52 can be, for example, a complementary metal-oxide-semiconductor transistor (CMOS) image sensor or a charge coupled device (CCD) image sensor. The chip 52 is received in the cavity 513 and is attached to the base board 511. A top surface of the chip 52 includes an active area (e.g., a photo-registering zone) 521 and a number of pads 523 arranged around the active area 521. One end of each wire 53 is connected/joined with a respective pad 523 of the chip 52, and the other end of the wire 53 is connected/joined with a respective contact 514 of the carrier 51.

The bottom surface of the first fixture 211 of the lens module 20 is adhered to the top of the sidewall 512 of the carrier 51 of the chip package 50 to enclose the chip 52 in the cavity 513. The sidewall 512 of the carrier 51 has a predetermined height to separate the lens module 20 from the chip 52 at a suitable distance according to a desired focal length for the lens module 20. In such a manner, the lenses 218, 238, 258 of the lens module 20 can cooperatively form a focused image on the active area 521 of the chip 52. As is to be understood, the digital camera 100 has a fixed focus, according to such a configuration.

Figure 3:
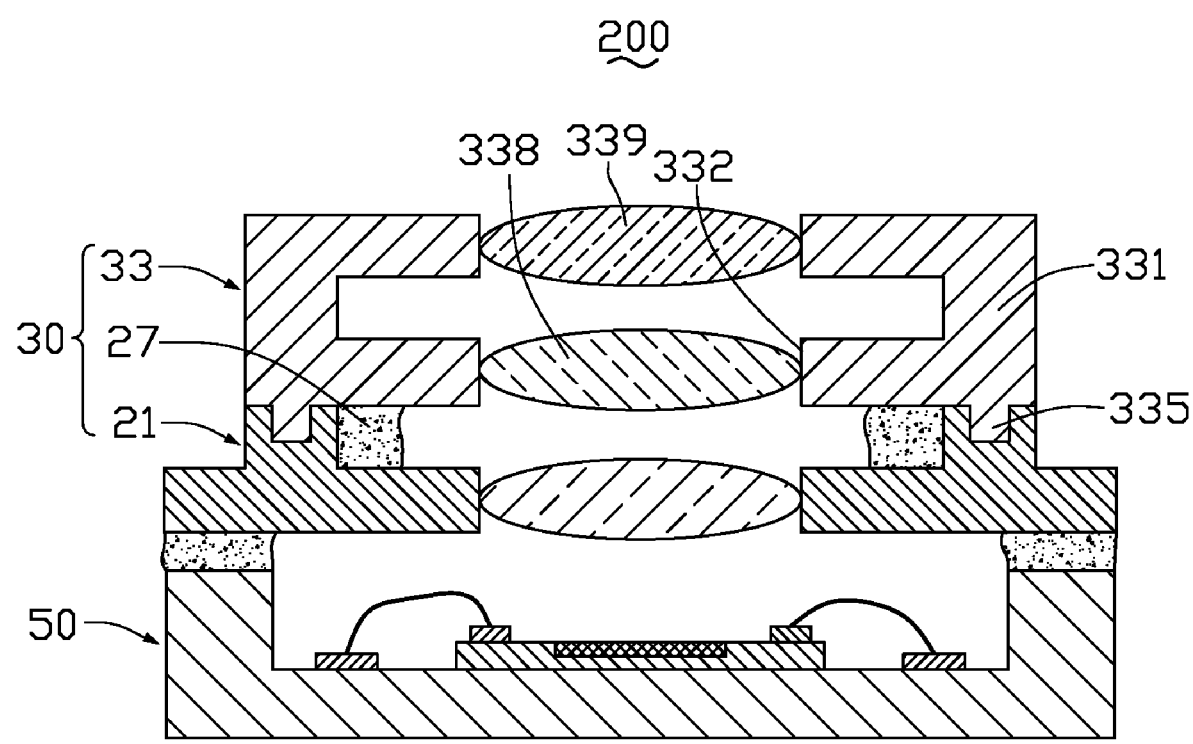
FIG. 3 is a schematic, cross-sectional view of a digital camera module having a lens module, according to a second preferred embodiment.

Referring to FIG. 3, a digital camera module 200, according to a second preferred embodiment, is shown. The digital camera module 200 has a similar structure to that of the digital camera module 100 and includes a lens module 30 and a chip package 50 arranged in a light path of the lens module 30. The lens module 30 includes a first lens assembly 21, a second lens assembly 33, and an adhesive 27. The digital camera module 200 is different from the digital camera module 100 mainly in the structure of the second lens assembly 33.

The second lens assembly 33 includes a second fixture 331, a second lens 338, and third lens 339. The second fixture 331 has a through hole 332 defined therein, and the second lens 338 and third lens 339 are received in the through hole 332. The second fixture 331 has a second bottom annular ring 335 downwardly and integrally protruding from a bottom surface thereof. In general, the second fixture 331 has a similar structure to that of the engaged second fixture 231 and the third fixture 251 of the digital camera module 100, except that the second fixture 331 of the digital camera module 200 has a one-piece structure.

Figure 4:
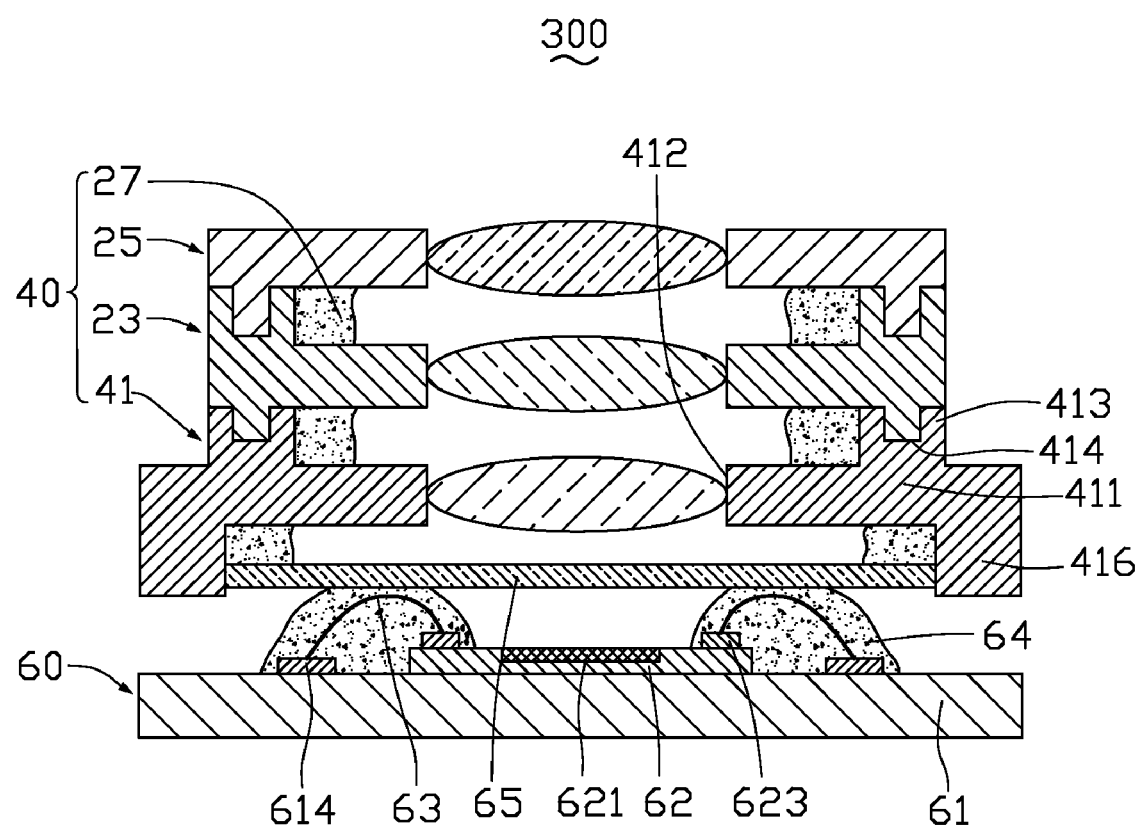
FIG. 4 is a schematic, cross-sectional view of a digital camera module having a lens module, according to a third preferred embodiment.

Referring to FIG. 4, a digital camera module 300, according to a third preferred embodiment, is shown. The digital camera module 300 has a similar structure to that of the digital camera module 100 and includes a lens module 40 and a chip package 60 disposed in a light path of the lens module 40. The lens module 40 includes a first lens assembly 41 having a first fixture 411, a second lens assembly 23, and a third lens assembly 25. The digital camera module 300 differs from the digital camera module 100 mainly in the structure of the first fixture 411, the structure of the chip package 60, and the means of mounting the lens module 40 to the chip package 60.

The first fixture 411 of the lens module 40 includes a through hole 412 defined therethrough, a first top annular ring 413 within a first annular slot 414 defined therein, and a frame section 416 downwardly and integrally protruding from a periphery of a bottom surface of the first fixture 411.

The chip package 60 includes a carrier 61, a chip 62, a plurality of wires 63, an adhesive 64, and a cover 65. The carrier 61 is board shaped and includes a plurality of contacts 614 arranged on a top surface thereof. The chip 62 is mounted to the top surface of the carrier 61 and is surrounded by the contact 614. The chip 62 has a top surface, an active area 621, and a plurality of pads 623 arranged on the top surface. The wires 63 electrically connect the pads 623 of the chip 62 to the contacts 614 of the carrier 61. The adhesive 64 is applied to the top surface of the carrier 61, around the chip 62 in a manner so as to cover/encapsulate the pads 623, joints of the pads 623 and the wires 63, the wires 63, and joints of the wires 63 and the contacts 614. The cover 65 is adhered to the adhesive 64 to hermetically enclose the active area 621 of the chip 62.

In assembly of the digital camera module 300, the frame section 416 of the first fixture 411 receives the cover 65 of the chip package 60. In receiving the cover 65, an inner side of the frame portion 416 tightly abuts against an outer side of the cover 65, and the bottom surface of the first fixture 411 is adhered to the top surface of the cover 65. The cover 65 supporting the lens module 40 is fixedly separated a predetermined distance, according to a focal length of the lens module 40, so that the lens module 40 can form a focused image on the active area 621 of the chip 62.

It is to be understood that the positions of each slotted annular ring and the corresponding male annular ring can be exchanged with each other. For example, in the first preferred embodiment, the male annular ring 235 can be disposed on the top surface of the first fixture 21, whilst the corresponding slotted annular ring 213 should, beneficially, be arranged on the bottom surface of the second fixture 23.

In addition, the annular ring in which the annular slot is defined can be omitted, and the annular slot can be directly defined in the top surface of the fixtures. Further, the annular rings can potentially be attached (e.g., mechanically, metallurgically, and/or adhesively) instead of being integral with a given fixture.

In the aforesaid preferred embodiments, the sidewall of the carrier and/or the cover of the chip package are configured to separate the lens module by a suitable distance, according to the focal length of the lens module, and the lens module can be directly mounted to the chip package to form a fixed-focus image on the chip. Therefore, there is no need for the process of adjusting the position of the lens module, and the assembling process of the digital camera module is easy and quick. In addition, there is minimal risk of mounting the lens module at a slant, so the image quality of the digital camera module may be, accordingly, much improved.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A lens module comprising:
   a first lens assembly comprising a first fixture having a through hole defined therein and at least one lens received in the through hole; and
   a second lens assembly comprising a second fixture having a through hole defined therein and at least one lens attached to the second fixture;
   wherein one of the first fixture and the second fixture has a slotted annular ring protruding therefrom with an annular slot defined therein, the other has a male annular ring extending therefrom, and the slotted annular ring and the male annular ring matingly engage with each other to fix the first lens assembly and second lens assembly together.

2. The lens module as claimed in claim 1, wherein the first fixture is board shaped and has a top surface and a bottom surface positioned opposite to the top surface, and the top surface has the slotted annular ring upwardly protruding therefrom, the slotted annular ring has an annular slot defined therein.

3. The lens module as claimed in claim 2, wherein the first fixture further has a frame portion, and the frame portion downwardly protrudes from a periphery of the bottom surface of the first fixture.

4. The lens module as claimed in claim 1, wherein the second fixture is board shaped and has a top surface and a bottom surface positioned opposite to the top surface, and the male annular ring downwardly protrudes from the bottom surface of the second fixture.

5. The lens module as claimed in claim 1 further includes an adhesive applied between two respective, adjacent surfaces of the first fixture and the second fixture.

6. A digital camera module comprising:
   a lens module comprising:
      a first lens assembly comprising a first fixture having a through hole defined therein and at least one lens received in the through hole; and
      a second lens assembly comprising a second fixture having a through hole defined therein and at least one lens attached to the second fixture;
      wherein one of the first fixture and the second fixture has a slotted annular ring protruding therefrom with an annular slot defined therein, the other has a male annular ring extending therefrom, and the slotted annular ring and the male annular ring matingly engage with each other to fix the first lens assembly and second lens assembly together; and
   a chip package disposed in a light path of the lens module to receive a focused image formed by the lens module.

7. The digital camera module as claimed in claim 6, wherein the first fixture is board shaped and has a top surface and a bottom surface positioned opposite to the top surface, and the top surface has the slotted annular ring upwardly protruding therefrom, the slotted annular ring has an annular slot defined therein.

8. The digital camera module as claimed in claim 7, wherein the first fixture further has a frame portion, and the frame portion downwardly protrudes from a periphery of the bottom surface of the first fixture.

9. The digital camera module as claimed in claim 6, wherein the second fixture is board shaped, and has a top surface and a bottom surface positioned opposite to the top surface, and the male annular ring downwardly protrudes from the bottom surface of the second fixture.

10. The digital camera module as claimed in claim 6, wherein the lens module further comprises an adhesive applied between two respective adjacent surfaces of the first fixture and the second fixture.

11. The digital camera module as claimed in claim 6, wherein the chip package comprises a carrier, a chip mounted to the carrier, and a plurality of wires electrically connecting the chip to the carrier.

12. The digital camera module as claimed in claim 11, wherein the carrier comprises a base board and a sidewall upwardly protruding form the base board, a cavity being formed between the base board and the sidewall, the chip being received in the cavity.

13. The digital camera module as claimed in claim 11, wherein chip package further comprises an adhesive and a cover; the adhesive is applied to the carrier, around the chip, and in a manner so as to cover a periphery of a top surface of the chip and to cover the wires and joints between the wires and the carrier; and the cover is fixed to the adhesive to enclose the chip.

* * * * *